Oct. 24, 1961 R. WELLS 3,005,491
CHAMBERLESS MOLD AND PROCESS OF MAKING SAME
Filed Oct. 8, 1958 5 Sheets-Sheet 1

INVENTOR
Roger Wells,
BY Karl W. Flocks
ATTORNEY

Oct. 24, 1961 — R. WELLS — 3,005,491
CHAMBERLESS MOLD AND PROCESS OF MAKING SAME
Filed Oct. 8, 1958 — 5 Sheets-Sheet 2

INVENTOR
Roger Wells,
BY Karl W. Flocks
ATTORNEY

Oct. 24, 1961 R. WELLS 3,005,491
CHAMBERLESS MOLD AND PROCESS OF MAKING SAME
Filed Oct. 8, 1958 5 Sheets-Sheet 3

INVENTOR
Roger Wells,
BY Karl W. Flocks
ATTORNEY

Oct. 24, 1961 R. WELLS 3,005,491
CHAMBERLESS MOLD AND PROCESS OF MAKING SAME
Filed Oct. 8, 1958 5 Sheets-Sheet 4

Inventor
Roger Wells,
By Karl W. Flocks
Attorney

Oct. 24, 1961   R. WELLS   3,005,491
CHAMBERLESS MOLD AND PROCESS OF MAKING SAME
Filed Oct. 8, 1958   5 Sheets-Sheet 5

Inventor
Roger Wells,
By Karl W. Flocks
Attorney

United States Patent Office 3,005,491
Patented Oct. 24, 1961

3,005,491
CHAMBERLESS MOLD AND PROCESS OF MAKING SAME
Roger Wells, Stamford, Conn., assignor to Diamond National Corporation, a corporation of Delaware
Filed Oct. 8, 1958, Ser. No. 766,080
8 Claims. (Cl. 162—411)

The present invention relates to a mold for molding articles of pulp, and more particularly to such a mold that does not have a chamber.

There has been a demand during the past years for containers, plates, and the like which are satisfactory for a limited number of uses and which are of very low cost. To satisfy this demand, such articles have been made of molded pulp. Typically, the equipment used for molding pulp comprises a large wheel which has attached to the periphery thereof a plurality of molds, these molds being provided with holes through their faces which communicate with a chamber behind the mold, and this chamber is placed in communication with a source of suction, and in some cases the mold may also be placed in communication with a source of pressure. A part of the wheel dips into a tank holding a slurry of paper and/or wood pulp, this slurry being approximately one percent pulp by weight. As the wheel rotates, a particular mold will enter into the tank and due to the suction, will suck the slurry against the mold face. A screen over the mold face catches and holds the pulp fibers which "felt" onto the screen, and a large amount of water is drawn through the mold and is conducted through the cavity and towards the source of vacuum.

In present high production pulp molding machinery, the tank is at the bottom of the wheel, and the wheel rotates continuously, so that a particular mold is dipped into the tank and then emerges from the tank. To remove the molded article from the mold, when the mold has rotated 270° from the bottom position, the vacuum is disconnected and air is blown through the previously mentioned communication system to blow the article off of the mold.

It is well known to those skilled in the art that the faster the wheel can rotate, the less time will be required in the production of an article, and therefore the less the article will cost. Consequently, considerable effort has been made to provide pulp molding machinery which will operate as rapidly as possible. However, it has been found that there are many limiting factors to the operating speed of the machinery, such as the amount of suction available, the concentration of the slurry, the depth and thickness of the article being molded. All of these factors go toward determining the time that a mold must be immersed in the slurry, and in addition, the time necessary to remove the article from the mold.

In previous attempts to lower the costs of molded pulp products, some improvement in the time per unit has been made by the expedience of enlarging the molding wheel and/or increasing the diameter of the wheel. These expedients have not met with signal success because whereas they were attempts to move the mold more quickly through the slurry, it was found that these measures did not provide ample time for the removal of the article from the mold. It was also found that these solutions to the problem resulted in a deterioration in the quality of the article, and this is undesirable even though the article is, inherently and relatively speaking, a low cost item. This deterioration in the article comes about because of the wetting of the article when it is blown off the mold by air pressure, this occurring because of the fact that water remains in the communication system so that when the air pressure is applied to the system the direction of air flow is reversed and is towards the mold, rather than away from the mold, and the outgoing air sweeps along the water in the communication system and blows it onto the molded article. This has been found to be true even though there have been provided for many years molds having chambers behind them which are intended to catch the water under such circumstances.

Another factor in the production of articles of molded pulp has been the cost of making the molds. Typically, molds are made of bronze which is machined to the desired shape and is approximately ⅜" in thickness. The making of such molds is a laborious, painstaking, time-consuming process which is inherently expensive. It may be noted that this manner of making molds was developed and now succeeds a former method in which many plates or laminations were used to form a mold. The laminated mold has now been discarded by the art because of its expense, weight and the length of time needed to make it.

Where relatively large articles are involved the molding wheel type of equipment is not practical, so that the molds are supported on a mechanism to give them a reciprocating motion into and out of the slurry tank. Such large articles are extremely difficult to mold because machinery to invert the mold is necessarily large and cumbersome, and mold inversion is practically a necessity in order to drain the water from the system in a minimum amount of time. Thus, with existing equipment the molding of large articles, such as sheets of many square feet area is uneconomical because of the complex equipment to invert the large molds.

Also, it will be understood that the large size molds require a strong and complicated supporting structure in order to withstand the forces imposed on them by the vacuum applied to them during the molding operation, this vacuum typically being twenty-two inches. The supporting structure for a large mold will be extremely complicated if the mold itself is for the molding of a complicated article having many depressions and elevations and steep angles.

It will therefore be readily understood that known production molding equipment produces articles at higher costs than are desirable because of the limiting factors on the speed of operation of the equipment to produce articles of satisfactorily high quality, and because of the expense involved in making the presently used molds.

An object of the present invention is the provision of a mold for use on pulp molding machinery which will permit such machinery to be operated at higher speeds and lower costs.

Another object of the present invention is the provision of a mold for pulp molding machinery which is readily adaptable to existing equipment without requiring modification to such equipment.

Still another object of the present invention is to provide a mold for pulp molding machinery which is lighter and less bulky than previous molds.

Still another object of the present invention is the provision of a mold for pulp molding machinery which will prevent the wetting of the molded article at the blow-off step in the operation of the machinery.

Yet another object of the present invention is to provide a mold for pulp molding machinery that does not have the usual cavity behind the mold.

A further object of the present invention is the provision of a mold in which tubular conduits are used in the mold to conduct the water and air from the inner sides of the drainage holes to the vacuum cavity of the molding wheels.

Yet another object of the present invention is to provide a mold for existing pulp molding machinery which will not require other than minor modification of such machinery.

Another object of the present invention is to provide a mold for pulp molding machinery which will permit the production of relatively large molded pulp articles, such as sheets 35 to 60 square feet in area, without the mold being inverted to drain.

A further object of the invention is the provision of a method of making a mold which is more rapid and less expensive than methods heretofore used.

Another object of the invention is the provision of a process for molding pulp articles that will enable the removal of the article without wetting it.

Other objects and many of the attendant advantages of the present invention will be apparent upon consideration of the following specification and drawing.

Figure 1:
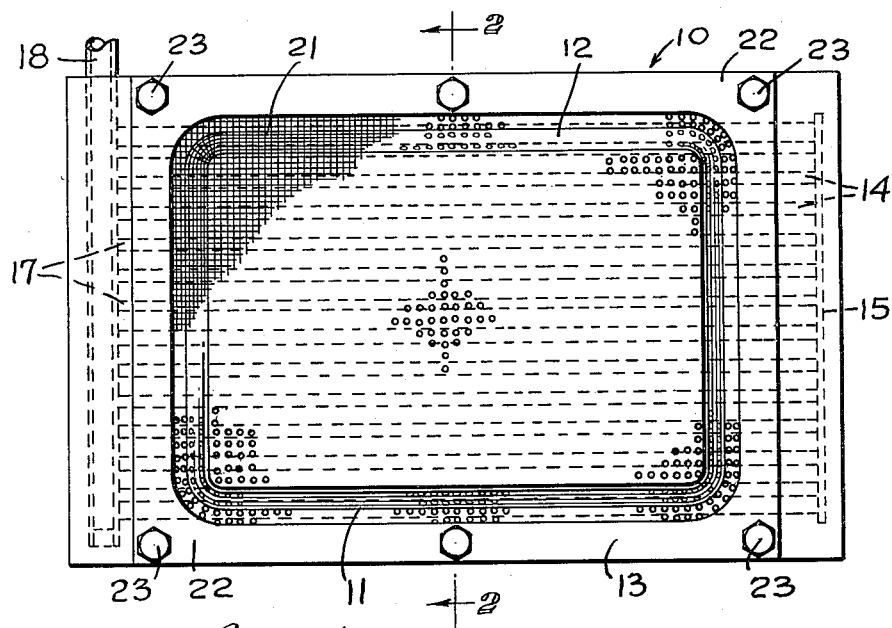
FIG. 1 is a plan view of a mold in accordance with the present invention.
Figure 2:
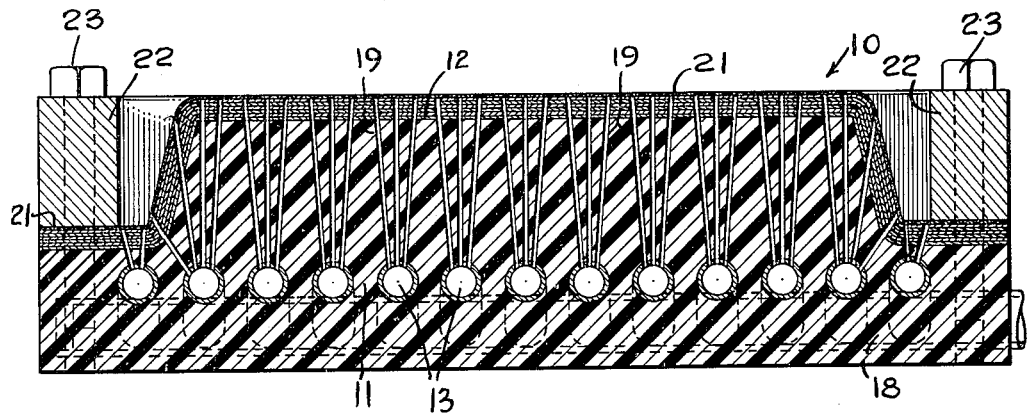
FIG. 2 is a sectional view taken on the line 2—2 of FIG. 1.

Turning now to the drawings wherein like reference characters are used to designate like or corresponding parts throughout the several views, there is shown in FIG. 1 a mold 10 having an integral one-piece body 11, body 11 having a molding face 12. A plurality of tubular members 13 are embedded in the body 11 and extend generally from one end of the body 11 to the other in parallel fashion. The ends 14 of the tubular members 13 are closed, either by being pressed together or by having a plug inserted therein or by having a closure member extending across their open ends. As shown in FIGS. 1 and 2, the ends 14 are closed by a continuous closure member 15 which extends across and is joined to the ends 14 of the various tubes 13.

The opposite ends 17 of the tubular members 13 enter into a manifold tube 18, and are hermetically sealed by any suitable means to the wall thereof.

Drainage holes 19 extend through the body 11 from the molding face 12 thereof and into the interior of the tubular members 13. A screen 21 overlies the molding face 12 of body 11 and is clamped thereto by a ring 22 which is secured to the body 11 by holding means 23, which are preferably bolts.

In operation, when the mold 10 is dipped into a pulp slurry, and suction is applied to the manifold tube 18, pulp fibres will be drawn against the screen 21, and water will be drawn through the screen 21, the drainage holes 19, the tubular members 13 and the manifold tube 18. When mold 10 is raised out of the pulp slurry, air will be drawn through the article molded on the mold 10 and through the parts of the mold above described.

The water which has entered into the parts of the mold 10 will be sucked completely through the system, or through the system to such an extent that when blow-off of the formed article occurs, the water will not be blown onto the article. Otherwise stated, with these tubular members and with the other variables such as slurry concentration and suction pressure within normal ranges, once the mold face 12 is free of the slurry, the air drawn into the mold will sweep the water along either completely through the communication system or sufficiently far into the system that reversal of the direction of air flow will not cause the water to flow back through the mold and out of the drainage holes 19.

Figure 3:
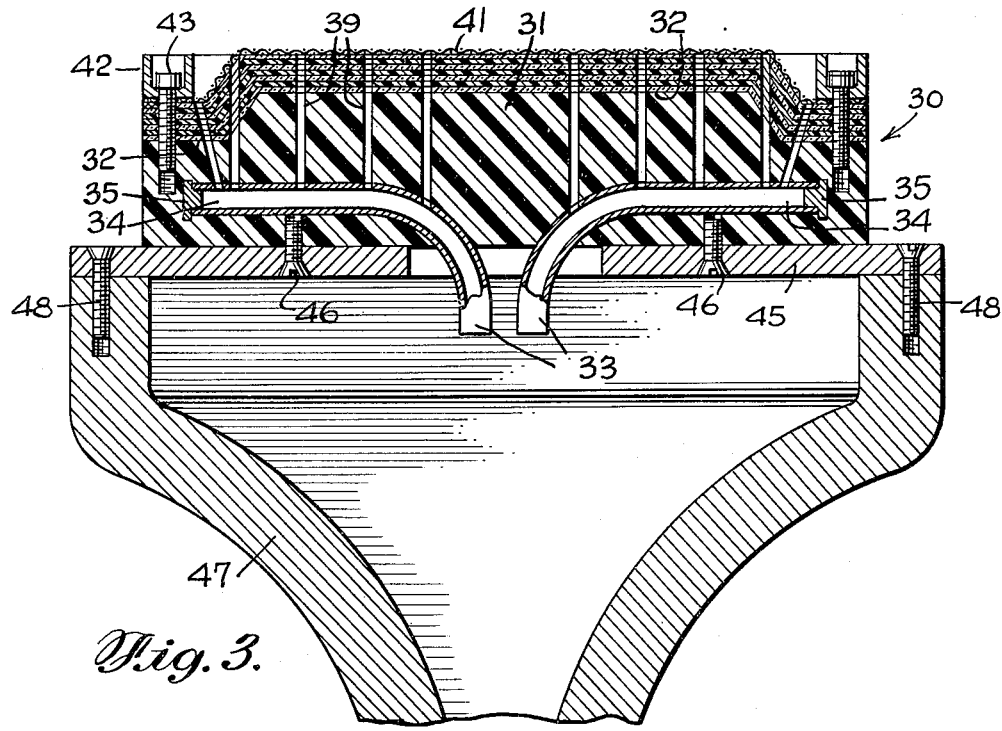
FIG. 3 is a sectional view of another embodiment of the invention.

In FIG. 3 there is shown a mold 30 having a body 31 with a molding face 32. Tubular members 33 extend from the sides of the mold inwardly towards the center and then through the back of the mold. The outer ends 34 of the tubular members 33 are closed by plugs 35. Drainage holes 39 extend from the molding face 32 through the body 31 and into the tubular members 33. The usual screen 41 extends over the molding face 32 and is secured to the body 31 by being clamped between the body 31 and a ring 42 which is secured to body 31 by the bolts 43.

Mold 30 is shown secured to an adapter plate 45 by screws 46, and the adapter plate 45 is secured to the periphery of a molding wheel 47 by screws 48.

The operation of mold 30 is substantially the same as the operation of molds 10, above described. However, the construction of mold 30 is such that the mounting thereof on standard molding wheels is easily accomplished by means of the aforementioned adapter plate 45, and thus requires no modification to the molding wheel 47 or any other part of the molding equipment.

It will be understood that with a mold as herein described, the mold size may be extended peripherally of the molding wheel to obtain abutment of adjacent molds. There is no restriction of their size as is the case with present equipment in which the size of the cavity is a limiting factor.

Figure 4:
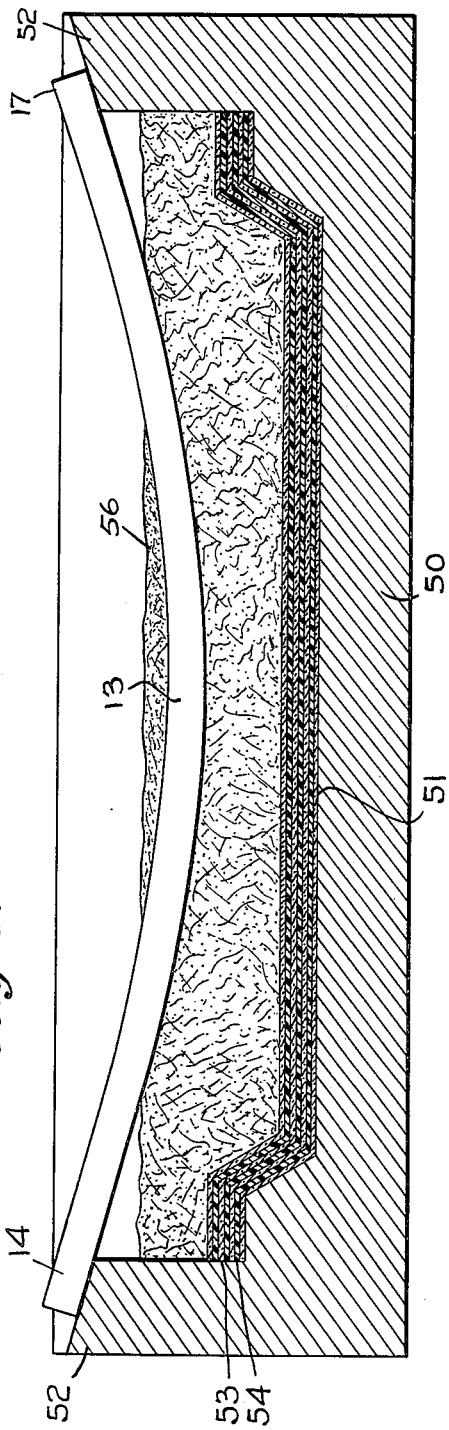
FIG. 4 is a sectional view showing the mold of FIG. 1 at an intermediate step in its construction.
Figure 5:
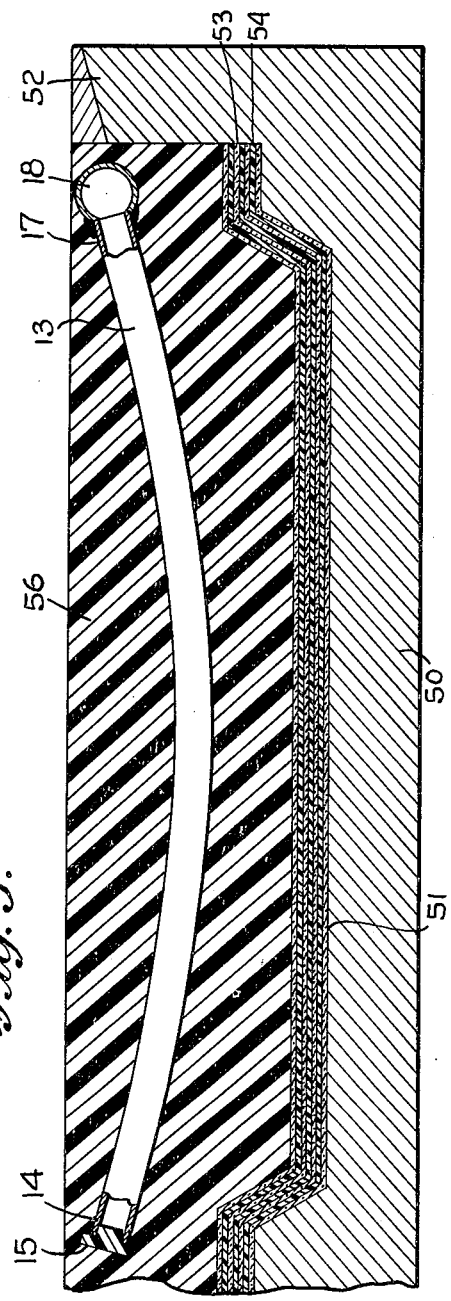
FIG. 5 is a view similar to FIG. 4 showing the mold after construction is completed.

To make the mold shown in FIGS. 1 and 2, a mold form 50 as shown in FIGS. 4 and 5 is used, mold form 50 having a molding face 51, and, if desired, upstanding side walls 52. Within the side walls 52 and against the mold face 51 there are placed a plurality of layers of fiberglass cloth 53 in alternate relationship with an epoxy resin layer 54, and four layers are shown. In some instances, the layers of cloth 53 and resin 54 may be omitted. After the fiberglass cloth 53 and epoxy resin 54 are placed against the mold face 51, some of the space within the walls 52 is filled with a mixture of fiberglass strands and epoxy resin. Thereafter, tubular members 13, having a natural curve, are placed on the upstanding walls 52 so that they descend into the space between the walls 52 in a generally catenary manner. More of the aforementioned mixture of glass strands and epoxy resin is packed in around the parallel tubular members 13 until the midportions thereof are covered and the mixture is generally level with the upper ends of the walls 52. The mold is then cured, that is to say the epoxy resin which is interspersed with the fiberglass layers 53 and also the epoxy resin in the mixture 56.

After the mold as thus formed has been cured, the ends 14 of the tubular members 13 are cut off and a sealing element 15 placed over the ends 14 to close them. Preferably, sealing element 15 is a strip of fiberglass cloth impregnated with an epoxy resin. A tube which is destined to become the manifold 18 is then closed at one end and has holes made in its side to receive the ends 17 of the tubular members 13. The manifold 18 is then joined with the ends 17 of the tubular member 13, and may be hermetically sealed thereto as by the use of more epoxy resins.

After the manifold 18 is attached to the end 17 of the tubular members 13, the manifold 18 may be enclosed within a mixture of the resin and fiberglass strands and/or cloth so as to give a solid and uniform mold structure.

The aforementioned drainage holes 19 are then drilled from numerous points on the molding face of the mold and into the tubular members 13.

Figure 6:
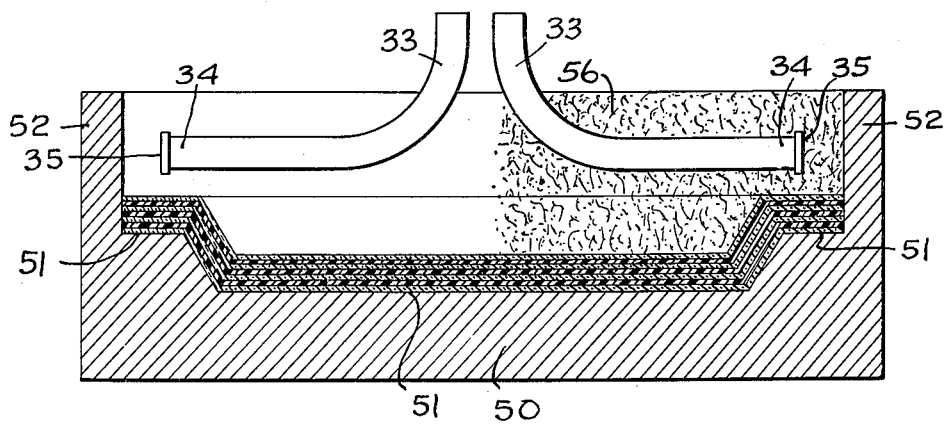
FIG. 6 illustrates the method of making the mold shown in FIG. 3.

To make a mold as shown in FIG. 3, reference is made to FIG. 6, wherein there is shown a mold form 50 having the usual molding face 51 and optionally standing walls 52. The space within the mold form 50 is initially and partially filled with a mixture 56 of fiberglass strands and an epoxy resin. Thereafter several tubular members 33 are placed in the space within the mold form 50 so that they are in/on the mixture 56 and are a slight distance from the mold face 51. Ends 34 of the tubular members 33 are closed, as by a plug 35. The remainder of the space within the mold form 50 is then filled with the mixture 56, the tubular members being held in the desired position by any suitable means. As will be obvious, the free ends of the tubular members 33 extend from the mixture 56. The mixture 56 is then permitted to cure and the partially completed mold 30 is removed from the mold form 50. Thereafter, drainage holes 39 are drilled as above noted.

After drilling of the drainage holes in both the forms shown in FIGS. 4 and 5 and in FIG. 6, the screen and ring are secured to complete the mold in known fashion and where desired the adapter plate 45 is also secured to the mold in known fashion.

It will be recognized that there are many known epoxy resins on the market which are suitable for this application, and that an amine type curative may be used so that the curing may be accomplished at room temperature.

Figure 7:
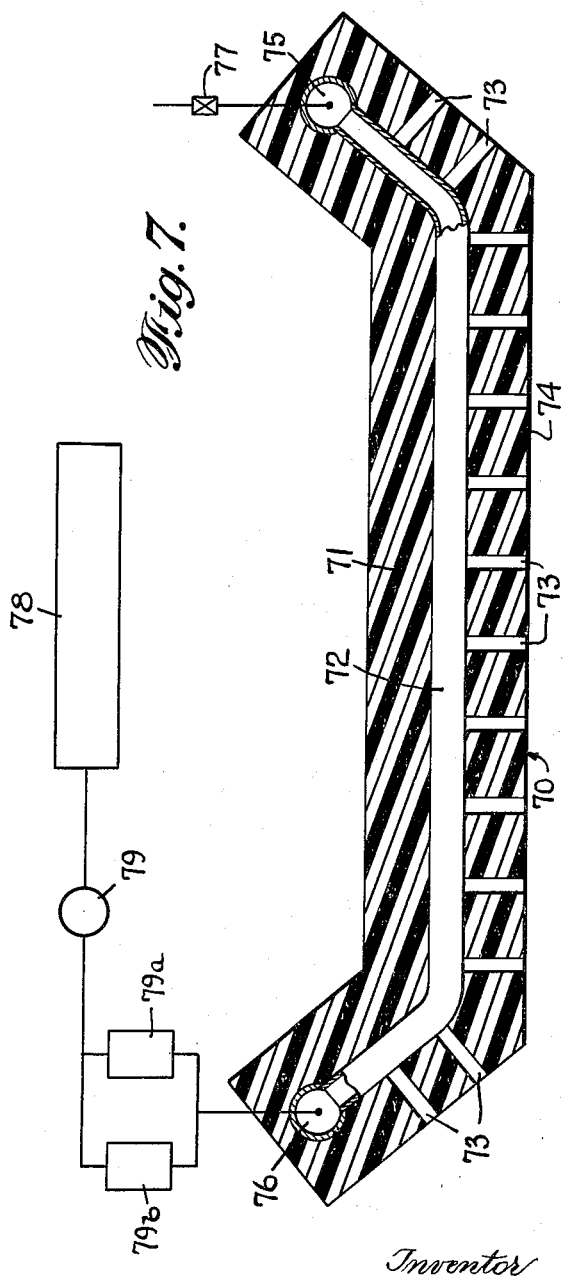
FIG. 7 is a cross-sectional view of still another embodiment of the invention.
Figure 10:
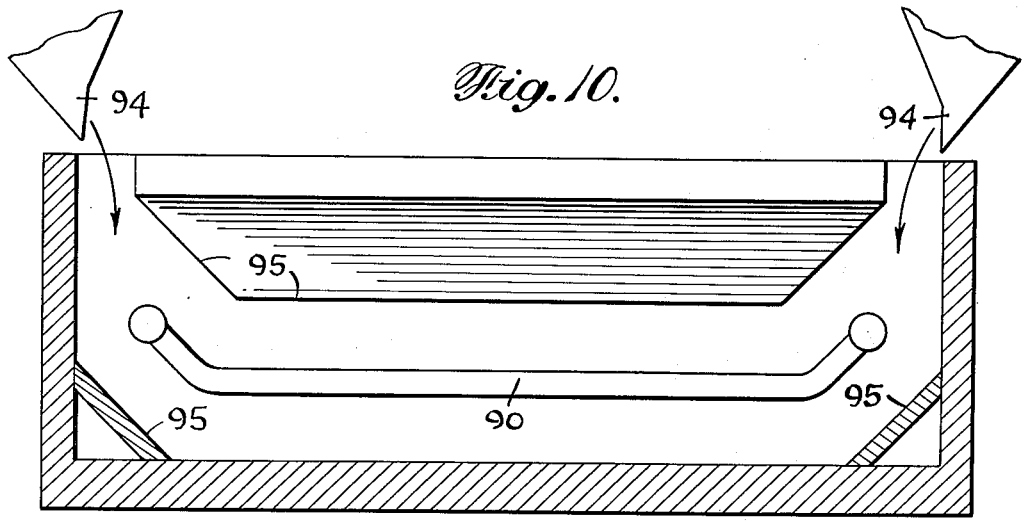
FIG. 10 and FIG. 11 illustrate other steps in the process.
Figure 11:
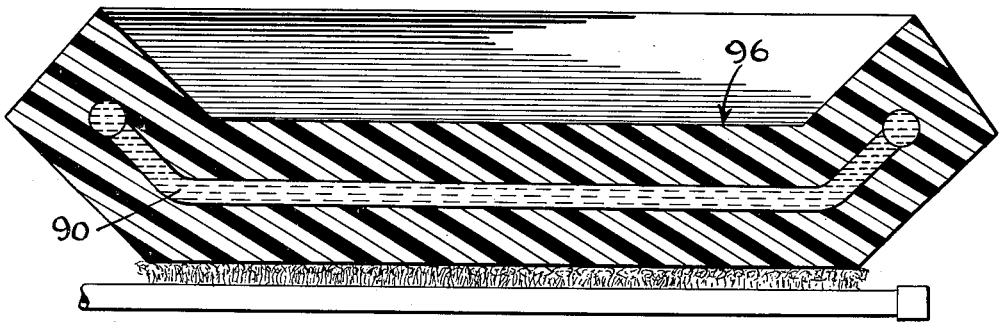
Figure 12:
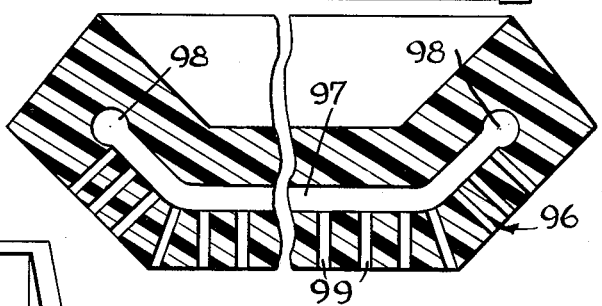
FIG. 12 is a view showing the mold made by the process of FIGS. 9, 10, and 11.

In FIG. 7 there is shown another embodiment of the invention in which a mold 70 comprises a moldable material 71 having a plurality of tubes extending therethrough, only one tube, tube 72, being shown. A plurality of drainage holes 73 connect tubes 72 with the molding surface 74.

Material 71 may be either a thermosetting or thermoplastic casting compound, and could include metals or metal-like compounds, preferably those having relatively low melting points. The tubes 72 may be of metal, such as copper and aluminum, or plastic such as polyvinylchloride or polystyrene. Such tubing may be readily bent into shape.

The tubes 72 are connected at their ends to the manifolds 75 and 76, the former being connected to a source of vacuum through a control valve 77. The other manifold 76 is connected to a source of compressed air 78 through a reducing valve 79, which may, of course, be shut off entirely and which is connected to the mold 70 through the needle valve 79a and poppet valve 79b, these latter two valves being connected in parallel as shown.

Figure 8:
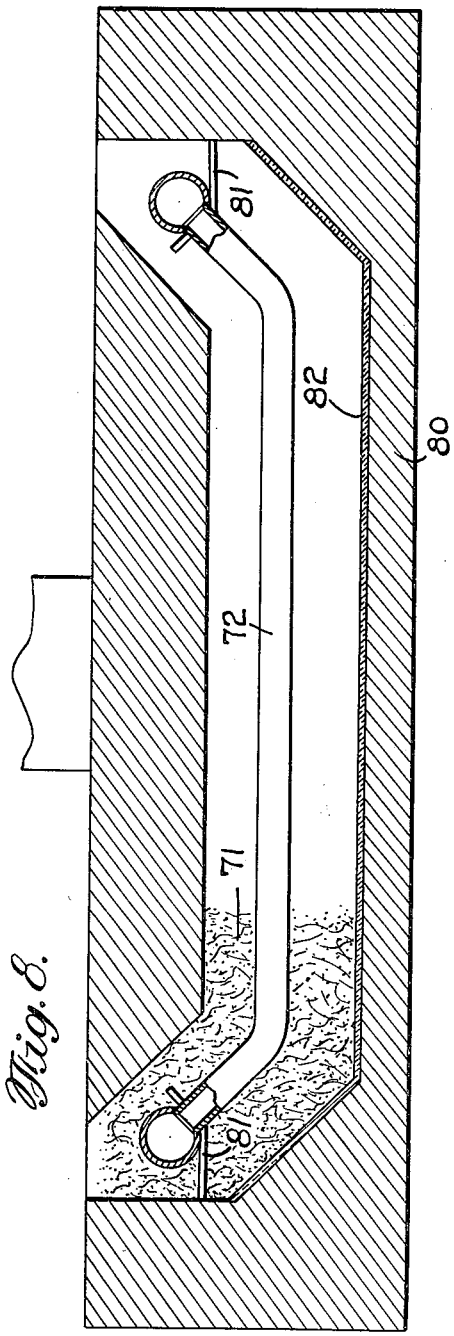
FIG. 8 is a view with parts broken away and showing a step in the process of making the mold of FIG. 7.

To make a mold 70, the tubes 72 are first bent to the desired configuration and are connected at both ends to the manifolds 75 and 76. This structure is then placed into a mold form 80, as shown in FIG. 8, supported above the bottom of the mold 80 by members 81 and/or fiberglass cloth 82. The moldable material 71 is then poured into the form 80, thus embedding the tubes 72. After setting of material 71, the entire structure is removed from the mold form and the drainage holes 73 drilled from the molding face 74 to the tubes 72. The usual screen is then placed over mold face 74. It will be noted from FIG. 7 that the back of the mold 70 has generally the same configuration as the mold face 74, hence the mold 70 is relatively thin and light.

In use, the mold 70 will be immersed in the usual pulp slurry, the manifolds 75 and 76 being connected as shown in FIG. 7 and described above. After the felting of the fibers on the screen of the mold, the mold will be removed from the slurry and the vacuum will cause air to be drawn through the article on the mold and to carry with it a great amount of the water in the article. This water will be swept along the drainage holes 73, tubes 72 and manifold 75. Also, a small amount of air may be permitted to enter manifold 76 through reducing valve 79 and needle valve 79a, and this air will aid in the sweeping of the water along the tubes 72 and manifold 75 to aid in removing the water from the vicinity of mold 70.

When the molded article is to be removed from mold 70, poppet valve 79b is opened to admit a blast of air to mold 70 and thus blow off the molded article, the valve 77 being then closed.

The mold 70 is a light, compact, easy-to-manufacture mold that may be economically produced from abundant materials. It produces a superior article in that the article is not wetted during the blow-off step of the molding process.

Figure 9:
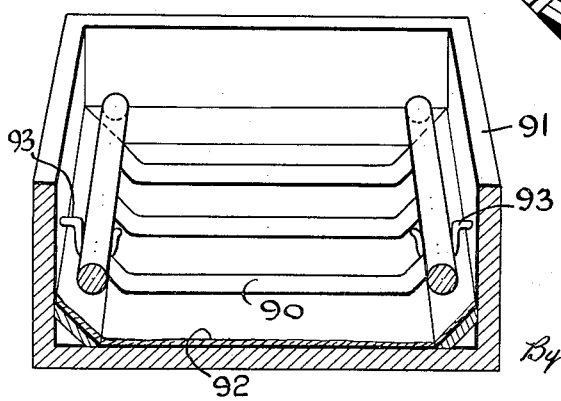
FIG. 9 is a perspective view of a first step in another process for making a mold in accordance with the invention.

In FIG. 9 there is shown a framework 90 of rods or bars of the same general shape as in FIG. 7. Framework 90 is made of material of low melting point, such as type metal, and is placed in the mold box 91, preferably over a layer of fiberglass cloth 92 and/or suspended in the mold box 91 by the members 93. Thereafter casting material 94 is poured into the mold box 91 between the shaping plates 95 and permitted to cure. The cured mold 96 is then removed from mold box 91 and heated to at least the fusion temperature of the material of framework 90, which melts, and is poured out of the mold 96 to leave the passages 97 and manifolds 98 therein. Thereafter, the drainage holes 98 are drilled from the molding face into the passages 97.

Each of the molds above described may be seen to be a mold that is of simple construction, without a chamber and readily fabricated by the use of a casting material. In addition, the molds' fluid systems all have the following characteristic construction: the fluid passageways comprising the drainage holes, the tubular members or passages, and the manifolds, are relatively streamlined, being generally rounded along their lengths, and preferably have circular cross-sections. Further, the diameters of the drainage holes are relatively small and their spacing large, so that their aggregate area is relatively small for any given mold configuration. For example, holes three thirty-seconds of an inch in diameter, placed on one-half inch centers have been found to be very effective.

When the above-described molds are immersed in a pulp slurry, the vacuum applied sucks the water and pulp fiber, the water going through the fluid system and the fiber matting on the molding face. After a given thickness of fibers has been matted (determined by the degree of vacuum and the time of immersion) the mold is withdrawn from the slurry. The suction is continued and the flow of air causes much of the water to be removed from the matted fibers which make up the preform on the mold. The intermingled water and air moves through the fluid system of the molds, the air sweeping the water along through the components of the fluid system. The air is able to sweep the water due to the fact that the elements of the fluid system are substantially all streamlined, or without corners in which the water can pocket, and also because of the high velocity of the air which results from the use of small drainage holes relatively widely spaced.

With the water thus swept along the elements of the fluid system of the molds, when the preform is removed by blow-back through the molds, there is no expulsion of water from the mold onto the preform, and this is true for both the molds of FIGS. 1 to 6 in which blow-back air is supplied through the single manifold, and also for the molds of FIGS. 7–12 in which two separate manifolds are used. Further, the blow-back without expulsion of water is accomplished in the molds of the invention without resorting to mold inversion.

It will be obvious to those skilled in the art that various changes may be made without departing from the spirit of the invention and therefore the invention is not limited to what is shown in the drawings and described in the specification, but only as indicated in the appended claims.

What I claim is:

1. A process for making a chamberless perforated mold for suction molding pulp articles, comprising arranging a plurality of lengths of generally straight tubing in spaced parallel relation extending lengthwise entirely across the mold being made, closing one end of each of said lengths of tubing, connecting the opposite ends of each of said lengths of tubing into fluid communication with a tubular manifold extending along the mold, packing a mixture of glass strands and curable resin around the lengths of tubing to form a contoured mold body, curing said resin, and drilling a plurality of drainage perforations through the contoured mold body and into each of the lengths of tubing at equally spaced intervals therealong.

2. A process for making a chamberless perforated mold for suction molding pulp articles, comprising arranging a plurality of lengths of generally straight tubing in spaced parallel relation extending lengthwise entirely across the mold being made, connecting one end of each of said lengths of tubing on one side of the mold into fluid communication with a tubular suction manifold extending along said one side of the mold, connecting the opposite ends of each of said lengths of tubing into fluid communication with a tubular pressure manifold extending along the side of the mold, packing a mixture of glass strands and curable resins around the lengths of tubing intermediate the ends thereof to form a contoured mold body, curing said resin to solidify the body, and then drilling a plurality of drainage perforations through the contoured mold body and into each of the lengths of tubing at equally spaced intervals therealong.

3. A process for making a chamberless perforated mold for suction molding pulp articles, comprising arranging within a mold form having upstanding side walls a plurality of lengths of generally straight tubing in spaced parallel relation extending between said side walls so as to extend lengthwise entirely across the mold being made, packing a moldable mixture of glass strands and a curable resin into the mold form around the lengths of tubing intermediate the ends thereof and between the side walls of the mold form to embed the lengths of tubing in a contoured mold body, curing the resin to solidify the body, closing one end of each of the lengths of tubing on one side of the mold body, connecting the opposite ends of each of the lengths of tubing into fluid communication with a tubular manifold extending along the opposite side of the mold body, and then drilling a plurality of drainage perforations transversely through the contoured mold body and into each of the lengths of tubing at equally spaced intervals therealong.

4. A process for making a chamberless perforated mold for suction molding pulp articles, comprising arranging within a mold form having upstanding side walls a plurality of lengths of generally straight tubing in spaced parallel relation extending in a catenary between said side walls so as to extend lengthwise entirely across the mold being made, packing a moldable mixture of glass strands and a curable resin into the mold form around the lengths of tubing intermediate the ends thereof and between the side walls of the mold to embed the lengths of tubing in a contoured mold body, curing the resin to solidify the body, connecting one end of said lengths of tubing on one side of the mold into fluid communication with a tubular suction manifold extending along said one side of the mold body connecting the opposite ends of each of said lengths of tubing into fluid communication with a tubular pressure manifold extending along the opposite side of the mold body, and then drilling a plurality of drainage perforations transversely through the contoured mold body and into each of the lengths of tubing at equally spaced intervals between opposite ends thereof.

5. A chamberless perforated mold for suction molding pulp articles, comprising an integral one piece body of molded glass strand reinforced solidified resin contoured to have a suction forming face, a plurality of generally straight tubes arranged in spaced parallel relation extending lengthwise entirely across the mold body and embedded therein adjacent to the forming face across the entire width thereof, a manifold extending along the mold, one end of each of said tubes being connected in fluid communication with the manifold at intervals therealong and the opposite end of each of said tubes being closed, and a plurality of drainage perforations extending transversely through the mold body from the forming face thereof into each of said tubes at equally spaced intervals therealong.

6. A chamberless perforated mold for suction molding pulp articles, comprising an integral one piece body of molded glass strand reinforced solidified resin contoured to have a suction forming face, a plurality of generally straight tubes arranged in spaced parallel relation extending lengthwise entirely across the body and embedded therein adjacent to the forming face across the entire width thereof, a tubular suction manifold extending along one side of the mold body and connected at intervals therealong in fluid communication with one end of each of said tubes on said one side of the mold body, a tubular pressure manifold extending along the opposite side of the mold body and connected at intervals therealong in fluid communication with the opposite end of each of said tubes on said opposite side of the mold body, and a plurality of drainage perforations extending transversely through the mold body from the forming face thereof into each of said tubes at equally spaced intervals therealong.

7. The mold defined by claim 6 wherein the manifold is a tubular member extending across one side of the mold body at right angles to the plurality of spaced parallel tubes embedded in said body, and the ends of said tubes which are connected with the manifold are located at said one side of the mold body and at equal intervals along the manifold.

8. The mold defined by claim 5 wherein the spaced parallel tubes embedded in the mold body have one of their ends closed and located at one side of the mold body, and the opposite ends of the tubes project outwardly centrally from the mold body opposite the forming face thereof, said projecting ends of the tube communicating with the manifold.

References Cited in the file of this patent

UNITED STATES PATENTS

| | | |
|---|---|---|
| 1,717,996 | Moore | June 18, 1929 |
| 1,963,134 | Keiding | June 19, 1934 |
| 2,326,758 | Chaplain et al. | Aug. 17, 1943 |
| 2,584,110 | Blackburn et al. | Feb. 5, 1952 |
| 2,585,049 | Shepard | Feb. 12, 1952 |
| 2,718,826 | Lambert | Sept. 27, 1955 |
| 2,734,430 | Kletzien | Feb. 14, 1956 |
| 2,802,766 | Leverenz | Apr. 13, 1957 |
| 2,836,530 | Rees | May 27, 1958 |